United States Patent
Araki et al.

(10) Patent No.: US 9,624,788 B2
(45) Date of Patent: Apr. 18, 2017

(54) METHOD OF PREVENTING DEFORMATION IN GAS TURBINE CASING, PURGING DEVICE FOR EXECUTING THIS METHOD, AND GAS TURBINE PROVIDED WITH THIS DEVICE

(71) Applicant: MITSUBISHI HEAVY INDUSTRIES, LTD., Tokyo (JP)

(72) Inventors: Masato Araki, Tokyo (JP); Yoshifumi Iwasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1074 days.

(21) Appl. No.: 13/667,379

(22) Filed: Nov. 2, 2012

(65) Prior Publication Data

US 2013/0251501 A1    Sep. 26, 2013

(30) Foreign Application Priority Data

Mar. 26, 2012 (JP) ................................. 2012-069085

(51) Int. Cl.
F02C 7/18  (2006.01)
F01D 25/24  (2006.01)
F01D 21/00  (2006.01)

(52) U.S. Cl.
CPC ............. *F01D 25/24* (2013.01); *F01D 21/00* (2013.01); *F02C 7/18* (2013.01)

(58) Field of Classification Search
CPC .... F02C 7/18; F02C 7/185; F02C 7/20; F01D 25/14; F01D 25/24; F01D 21/00; F05D 2260/201

(Continued)

(56) References Cited

U.S. PATENT DOCUMENTS 5,746,173 A    5/1998 Takii et al.
6,065,282 A *  5/2000 Fukue ..................... F02C 7/185
                                              415/115

(Continued)

FOREIGN PATENT DOCUMENTS

CN    101965443 A    2/2011
JP    06-026364 A    2/1994

(Continued)

OTHER PUBLICATIONS

Office Action dated Sep. 17, 2015 issued in counterpart Chinese Patent Application No. 201280071674X, with English translation (9 pages).

(Continued)

*Primary Examiner* — William H Rodriguez
*Assistant Examiner* — Jason H Duger
(74) *Attorney, Agent, or Firm* — Westerman, Hattori, Daniels & Adrian, LLP (57) ABSTRACT

In this method of preventing deformation in a turbine casing of a gas turbine, in a turbine casing 10 there is arranged a buffer tank 30. In this buffer tank 30 there are formed a stagnation part agitation air opening 52 which ejects part of the air from an air compressor 21 as stagnation part agitation air Ga2 toward a stagnation part 19 within the turbine casing, and an overall agitation air opening 51 which ejects overall agitation air Ga1 for agitating gas held in an upper space within the turbine casing. In the buffer tank 30 there is provided a partition wall 36 with through holes 53 formed therein serving to resist air from the air compressor 21, in order to make the ejection speed of the overall agitation air lower than the ejection speed of the stagnation part agitation air.

8 Claims, 8 Drawing Sheets (58) Field of Classification Search
USPC .......................................................... 60/806
See application file for complete search history.

(56) References Cited

U.S. PATENT DOCUMENTS

| | | | | |
|---|---|---|---|---|
| 7,299,618 | B2* | 11/2007 | Terazaki | F23R 3/26 60/39.37 |
| 7,708,518 | B2* | 5/2010 | Chehab | F01D 11/24 415/1 |
| 7,798,767 | B2* | 9/2010 | Kondo | F01D 21/00 415/108 |
| 7,987,660 | B2* | 8/2011 | Iwasaki | F01D 25/12 60/39.23 |
| 8,973,372 | B2* | 3/2015 | Lee | F02C 3/04 415/108 |
| 2006/0277915 | A1 | 12/2006 | Iwasaki et al. | |
| 2007/0271930 | A1* | 11/2007 | Takaoka | F01D 5/06 60/806 |
| 2008/0310949 | A1 | 12/2008 | Kondo et al. | |

FOREIGN PATENT DOCUMENTS

| | | |
|---|---|---|
| JP | 10-082322 A | 3/1998 |
| JP | 2003-254010 A | 9/2003 |
| JP | 2006-037855 A | 2/2006 |
| JP | 2006-342783 A | 12/2006 |
| JP | 2006-342784 A | 12/2006 |
| JP | 4015560 B2 | 11/2007 |

OTHER PUBLICATIONS

International Search Report of PCT/JP2012/078376, mailing date Jan. 22, 2013.
Written Opinion of PCT/JP2012/078376, mailing date Jan. 22, 2013.

* cited by examiner

METHOD OF PREVENTING DEFORMATION IN GAS TURBINE CASING, PURGING DEVICE FOR EXECUTING THIS METHOD, AND GAS TURBINE PROVIDED WITH THIS DEVICE

BACKGROUND OF THE INVENTION

Field of the Invention

The present invention relates to a method of ejecting air into a gas turbine casing to thereby prevent deformation in the turbine casing, a purging device for executing this method, and a gas turbine provided with this device.

Priority is claimed on Japanese Patent Application No. 2012-069085, filed Mar. 26, 2012, the contents of which are incorporated herein by reference.

Description of Related Art

A gas turbine is provided with; a compressor which compresses air to produce compressed air, a combustor which mixes fuel with the compressed air and combusts it to produce combustion gas, a rotor which is rotated by the combustion gas, and a casing which covers the rotor while allowing it to rotate therein. In this gas turbine, in a state where fuel supply to the combustor is stopped, high temperature gas is held within a turbine casing of the casing, and a temperature difference occurs between an upper part and a lower part of the turbine casing. As a result, a so-called cat back phenomenon occurs, in which the turbine casing upper part where the temperature is high expands relatively with respect to the turbine casing lower part where the temperature is low, deforming the turbine casing like the back of a cat.

If this cat back phenomenon occurs, spacing between the rotor and the stationary body partly becomes narrower, and there is a possibility that the rotor and the stationary body may come in contact with each other.

Consequently, in order to prevent this cat back phenomenon, Patent Document 1 cited below proposes a purging device which ejects air into the turbine casing. This purging device is provided with a first air ejecting pipe and a second air ejecting pipe for ejecting air into the turbine casing. The second air ejecting pipe ejects air inward from the outer side in the radial direction perpendicular to the rotor shaft. On the other hand, the first air ejecting pipe ejects air more toward the upstream side, that is, more toward the side toward the compressor side, with approach from the radially outer side to the radially inner side.

PRIOR ART DOCUMENT

Patent Document

[Patent Document 1] Japanese Unexamined Patent Application, First Publication No. 2006-342784

SUMMARY OF THE INVENTION

Problems to be Solved by the Invention

In the purging device disclosed in Patent Document 1, the diffuser upper part of the compressor, which projects into the turbine casing, becomes a part where gas flow stagnates, and consequently, the air which is ejected toward this stagnation part from the first air ejecting pipe actively agitates the stagnation part. Meanwhile, the air ejected from the second air ejecting pipe agitates the overall upper part within the turbine casing excluding the stagnation part.

In this manner, in this purging device, by providing two types of air ejecting pipes, the gas within the entire turbine casing including the stagnation part is efficiently agitated, and the temperature difference within the turbine casing is made small, to suppress deformation in the turbine casing.

However, in the purging device disclosed in Patent Document 1, it is hard to say that the gas within the entire turbine casing including the stagnation part is sufficiently agitated, and locations which locally do not get agitated may remain in some cases. Moreover, adversely, the vicinity of the purging device may locally be excessively cooled. As a result, there is a possibility that the purging device disclosed in Patent Document 1 may not sufficiently suppress deformation in the turbine casing in some cases.

Consequently, an object of the present invention is to provide a method capable of sufficiently agitating the entire interior of a turbine casing, and preventing local excessive cooling, to thereby suppress deformation in the turbine casing to a minimum level, and a purging device for executing this method, and a gas turbine which is provided with this purging device.

Means for Solving the Problem

As a result of investigating the purging device disclosed in Patent Document 1, the present inventors have discovered that it is necessary to segregate ejected air from the first air ejecting pipe and ejected air from the second air ejecting pipe, in order to sufficiently agitate the entire interior of the turbine casing.

Specifically, in order to actively and efficiently agitate the stagnation part, air ejected from the first air ejecting pipe needs to travel substantially straight toward the stagnation part. That is to say, air ejected from the first air ejecting pipe is required to have a straight traveling property. On the other hand, in order to agitate the entire upper interior of the turbine casing excluding the stagnation part, it is necessary that there is no portion that does not get agitated locally, and that local excessive cooling is prevented. That is to say, air ejected from the second air ejecting pipe is required to diffuse broadly.

In order to increase the straight traveling property of the air, it is preferable that the ejection speed of the air is increased. On the other hand, in order to increase the diffusing property of the air, it is preferable that the ejection speed of the air is lowered. Accordingly, by relatively lowering the ejection speed of the air from the second air ejecting pipe with respect to the ejection speed of the air from the first air ejecting pipe, it is possible to sufficiently agitate the entire interior of the turbine casing.

Consequently, the present inventors provide the following purging device, based on the above knowledge.

That is to say, in a purging device which ejects air into a turbine casing of a gas turbine to prevent deformation in this turbine casing when the gas turbine is in a stop state, there are provided:

an air supply source which supplies the air;

a stagnation part agitation air ejecting part with a stagnation part agitation air opening formed therein through which part of the air is ejected as stagnation part agitation air toward a stagnation part where gas flow stagnates in the turbine casing;

an overall agitation air ejecting part with an overall agitation air opening formed therein, through which part of the air is ejected as overall agitation air toward a portion in the turbine casing different from the stagnation part, to agitate gas held in an upper space of the turbine casing; and an ejection speed adjusting device which makes an ejection speed of the overall agitation air from the overall agitation air opening, lower than an ejection speed of the stagnation part agitation air from the stagnation part agitation air opening.

In this purging device, the ejection speed of the stagnation part agitation air becomes relatively higher than the ejection speed of the overall agitation air. Therefore, the straight traveling property of the stagnation part agitation air is increased, and the stagnation part, where high temperature air is held in a narrow region and is unlikely to be cooled, can be actively and effectively agitated. Moreover, in this purging device, the ejection speed of the overall agitation air becomes relatively lower than the ejection speed of the stagnation part agitation air. Therefore, the diffusing property of the overall agitation air becomes higher, and it is possible to have no portion in the interior of the turbine casing excluding the stagnation part, where gas therein does not get agitated, while preventing local excessive cooling.

Therefore, in this purging device, since the air in the entire interior of the turbine casing can be sufficiently agitated and local excessive cooling can be prevented, it is possible to suppress the temperature difference to a minimum between the respective parts of the interior of the turbine casing. As a result, in this purging device, it is possible to suppress deformation in the turbine casing to a minimum when the gas turbine is in a stop state.

Here, in the purging device, the ejection speed adjusting device may have a pressure adjusting mechanism which makes the pressure of the air from the air supply source just before reaching the overall agitation air opening, lower than the pressure of the air from the air supply source just before reaching the stagnation part agitation air opening.

In this purging device, the pressure of the air from the air supply source just before reaching the overall agitation air opening becomes lower than the pressure of the air from the air supply source just before reaching the stagnation part agitation air opening. As a result, in this purging device, the ejection speed of the overall agitation air can be made relatively lower than the ejection speed of the stagnation part agitation air.

Moreover, in the purging device, the pressure adjusting mechanism may have an orifice which is arranged immediately before the overall agitation air opening and in which there is formed a through hole for allowing the air from the air supply source to travel therethrough. Furthermore, in the purging device, the ejection speed adjusting device may have a mesh structure body which is provided on the overall agitation air opening and in which there are formed a number of openings each having an area smaller than the opening area of the overall agitation air opening.

Moreover, the purging device may have a buffer tank; in the buffer tank, in the interior thereof, there may be formed an air chamber into which the air from the air supply source flows, and there may be formed the overall agitation air opening and the stagnation part agitation air opening; and the ejection speed adjusting device may be provided in the buffer tank.

In this purging device, two types of air at different ejection speeds are ejected into the turbine casing. However since only one type of air needs to be supplied into the buffer tank, the air compressor and the air line for feeding air from this air compressor to the turbine casing can be unified, and production cost of the purging device can be suppressed.

Moreover, in the purging device, there may be provided a primary line for allowing air from the air supply source to travel therethrough, an overall agitation air line which branches from the primary line and communicates with the overall agitation air opening, and a stagnation part agitation air line which branches from the primary line and communicates with the stagnation part agitation air opening, and the pressure adjusting mechanism may be provided on the overall agitation air line.

Furthermore, in the purging device, the air supply source may have a stagnation part agitation air supply source which supplies, to the stagnation part agitation air opening, the air serving as the stagnation part agitation air, and an overall agitation air supply source which supplies, to the overall agitation air opening, air which is the air serving as the overall agitation air and which is of a pressure lower than that of the air supplied from the stagnation part agitation air supply source. In this purging device, the stagnation part agitation air supply source and the overall agitation air supply source constitute the ejection speed adjusting device.

Moreover, a gas turbine provided by the present inventors is characterized in that there are provided the purging device and the turbine casing.

Furthermore, another gas turbine provided by the present inventors is characterized in that there are provided the purging device having a buffer thank, and the turbine casing; in the upper part of the turbine casing there is formed a manhole; this manhole is blocked by a manhole lid; and the buffer tank is fixed on the turbine casing inner side of the manhole lid.

In this gas turbine, the buffer tank is provided within the turbine casing. However, since most of this buffer tank is accommodated within the manhole, it is highly unlikely to obstruct the flow of compressed air within the turbine casing when the gas turbine is being operated. Furthermore, since this buffer tank is attached to the manhole lid, by removing the manhole lid from the turbine casing, this buffer tank can be easily taken out to the outside of the turbine casing. Therefore, the buffer thank can be easily repaired or modified.

The method of preventing deformation in the turbine casing of a gas turbine provided by the present inventors is characterized in that there are included:

a gas turbine stopping step of stopping fuel supply to the gas turbine; and an air ejecting step of ejecting stagnation part agitation air toward a stagnation part where gas flow within the turbine casing stagnates to thereby agitate gas within this stagnation part, and ejecting overall agitation air toward a portion different from the stagnation part within the turbine casing, at an ejection speed lower than that of the stagnation part agitation air to thereby agitate air being held in an upper space within the turbine casing.

In this method, the ejection speed of the stagnation part agitation air becomes relatively higher than the ejection speed of the overall agitation air. As a result, the straight traveling property of the stagnation part agitation air is increased, and the stagnation part can be actively and effectively agitated. Moreover, in this method, the ejection speed of the overall agitation air becomes relatively lower than the ejection speed of the stagnation part agitation air. Therefore, the diffusing property of the overall agitation air is increased, and it is possible to ensure there is no portion that does not get agitated within the turbine casing excluding the stagnation part.

Therefore, in this method, the air in the entire interior of the turbine casing can be sufficiently agitated, and the temperature difference can be suppressed to a minimum between the respective parts of the interior of the turbine casing.

Effect of the Invention

In the present invention, the air in the entire interior of the turbine casing can be sufficiently agitated, and the temperature difference can be suppressed to a minimum between the respective parts of the interior of the turbine casing. Therefore, according to the present invention, it is possible to suppress deformation in the turbine casing to a minimum when the gas turbine is in a stop state.

DETAILED DESCRIPTION OF THE INVENTION

Hereunder, embodiments of a gas turbine according to the present invention are described in detail, with reference to the drawings.

First Embodiment

Hereunder, a first embodiment of a gas turbine according to the present invention is described, with reference to FIG. 1 through FIG. 5.

Figure 1:
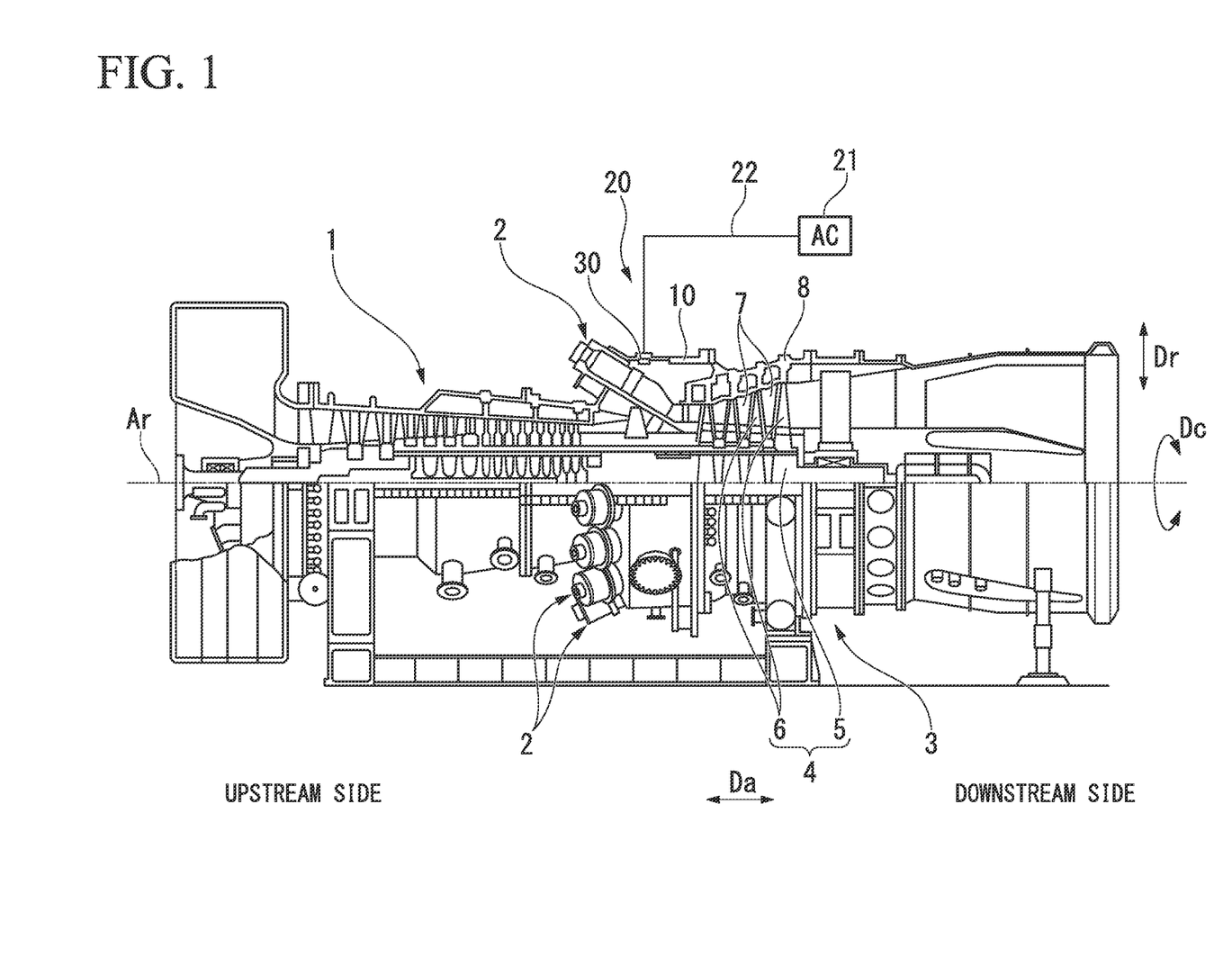
FIG. 1 is a cutaway overall side view of the main part of a gas turbine of a first embodiment according to the present invention.

The gas turbine of the present embodiment, as shown in FIG. 1, is provided with; a compressor 1 which compresses external air and produces compressed air Gp, a plurality of combustors 2 which mix fuel from a fuel supply source with the compressed air Gp and combust it to produce combustion gas Gc, and a turbine 3 which is driven by the combustion gas Gc.

The turbine 3 is provided with a rotor 4 which rotates about a rotor axis Ar, and a casing 8 which covers this rotor 4. To this rotor 4 there is connected, for example, a power generator which generates electricity with rotation of this rotor 4. Hereunder, the direction in which the rotor Ar extends is referred to as an axial direction Da, and in this axial direction Da, on the basis of the turbine 3, the side on which the compressor 1 is present is treated as an upstream side, and the opposite side thereof is treated as a downstream side. Moreover, the circumferential direction with respect to the rotor axis Ar is referred to simply as a circumferential direction Dc, and the radial direction with respect to the rotor axis Ar is referred to simply as a radial direction Dr.

The rotor 4 has a rotor main body 5 which extends in the axial direction Da about the rotor axis Ar, and a plurality of turbine blades 6 which are attached side by side in the circumferential direction Dc to this rotor main body 5.

The rotor 4 has a plurality of turbine blade stages, which are an aggregate of a plurality of the turbine blades 6 arranged side by side in the circumferential direction Dc. The respective turbine blade stages are provided on the rotor main body 5 side by side in the axial direction Da. On the inner periphery of the casing 8 there is provided a turbine vane stage on the upstream side for each of the plurality of turbine blade stages. Each turbine vane stage includes a plurality of turbine vanes 7 arranged side by side in the circumferential direction Dc.

The plurality of combustors 2 are arranged side by side in the circumferential direction Dc, on the upstream side of the most upstream side turbine vane stage. These combustors 2 are accommodated and fixed in a turbine casing 10, which forms part of the casing 8.

Figure 2:
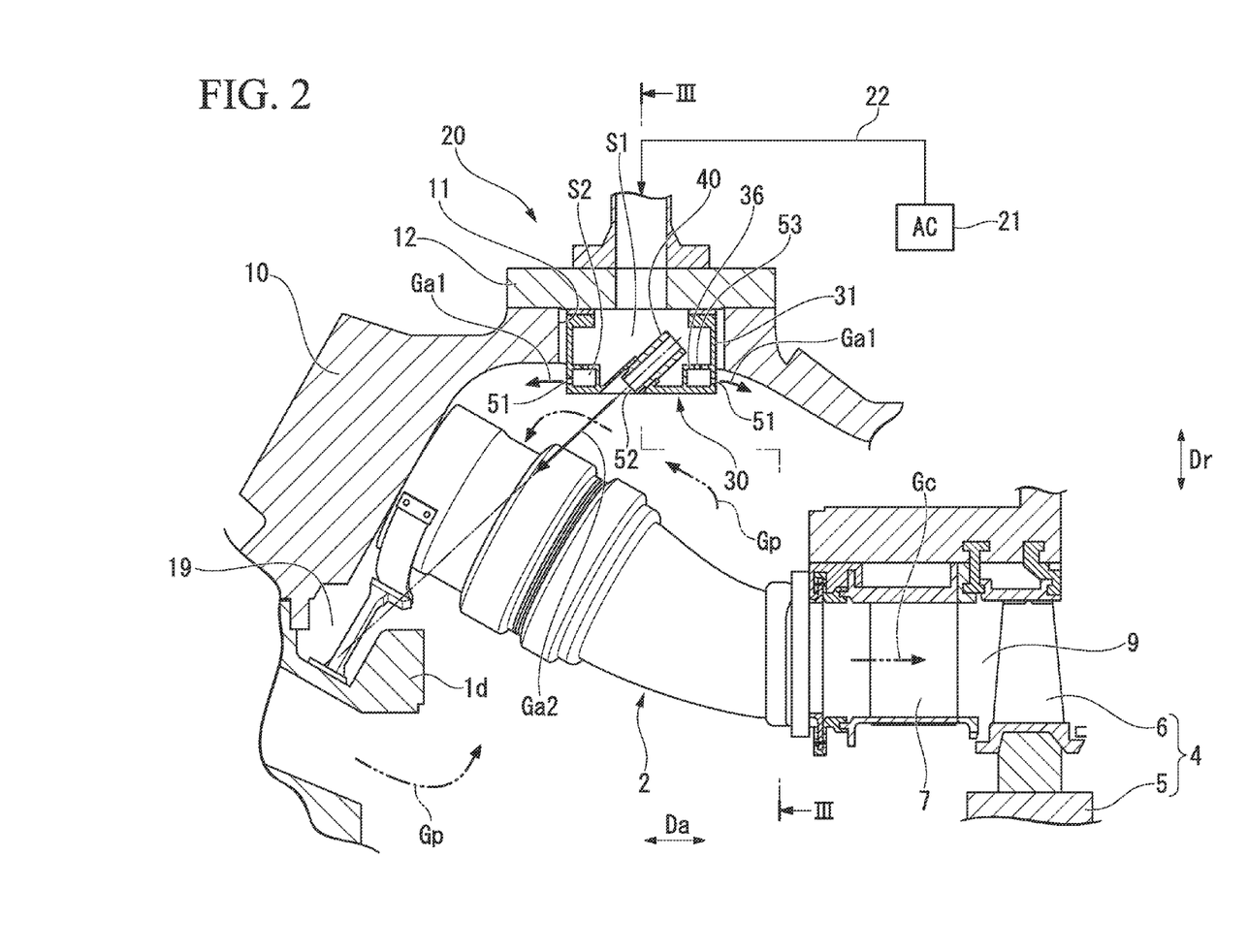
FIG. 2 is a sectional view of the main part of the gas turbine of the first embodiment according to the present invention.

As shown in FIG. 2, in the upper part of the turbine casing 10 there is formed a manhole 11, and this manhole 11 is blocked by a manhole lid 12.

Into this turbine casing 10, from the upstream side, there is projecting a part of a diffuser 1d of the compressor 1.

Compressed air Gp produced by the compressor 1 travels through this diffuser 1d and flows into the turbine casing 10. This compressed air Gp flows from the upstream side of the combustor 2 and flows into the combustor 2. As described above, fuel is supplied from the fuel supply source to the combustor 2. This fuel is mixed with the compressed air Gp in the combustor 2 and combusted. High temperature and high pressure combustion gas Gc produced as a result of this combustion exits the combustor 2 and flows into a combustion gas flow passage 9 where the turbine vanes 7 and the turbine blades 6 are present, and comes in contact with the turbine blades 6 to rotate the rotor 4.

Even in a gas turbine stop state where no fuel is being supplied to the combustor 2, some air from the diffuser 1d of the compressor 1 still flows into this turbine casing 10, due to the draft effect associated with a chimney exhaust structure provided on the further downstream side of the turbine 3. As with the compressed air Gp described above, this air travels through the combustor 2 and flows into the combustion gas flow passage 9. A region on the radially inner side of the upper combustors 2 among the plurality of combustors 2 arranged side by side in the circumferential direction Dc, and on the radially outer side of the diffuser 1d of the compressor 1 which projects into the turbine casing 10, forms a stagnation part 19 with respect to this air flow. That is to say, the air of this stagnation part 19 does not flow into the combustors 2 very much even if there is some air flow within the turbine casing 10 due to the draft effect when the turbine is in a stop state, since the flow stagnates therein.

Incidentally, the gas turbine of the present embodiment is further provided with a purging device 20 which ejects air into the turbine casing 10. This purging device 20 has: an air compressor 21 serving as an air supply source; a buffer tank 30 with an air chamber formed in the interior thereof, into which the air Ga from the air compressor 21 flows; and an air line 22 for feeding the air Ga from the air compressor 21 to the buffer tank 30.

Figure 3:
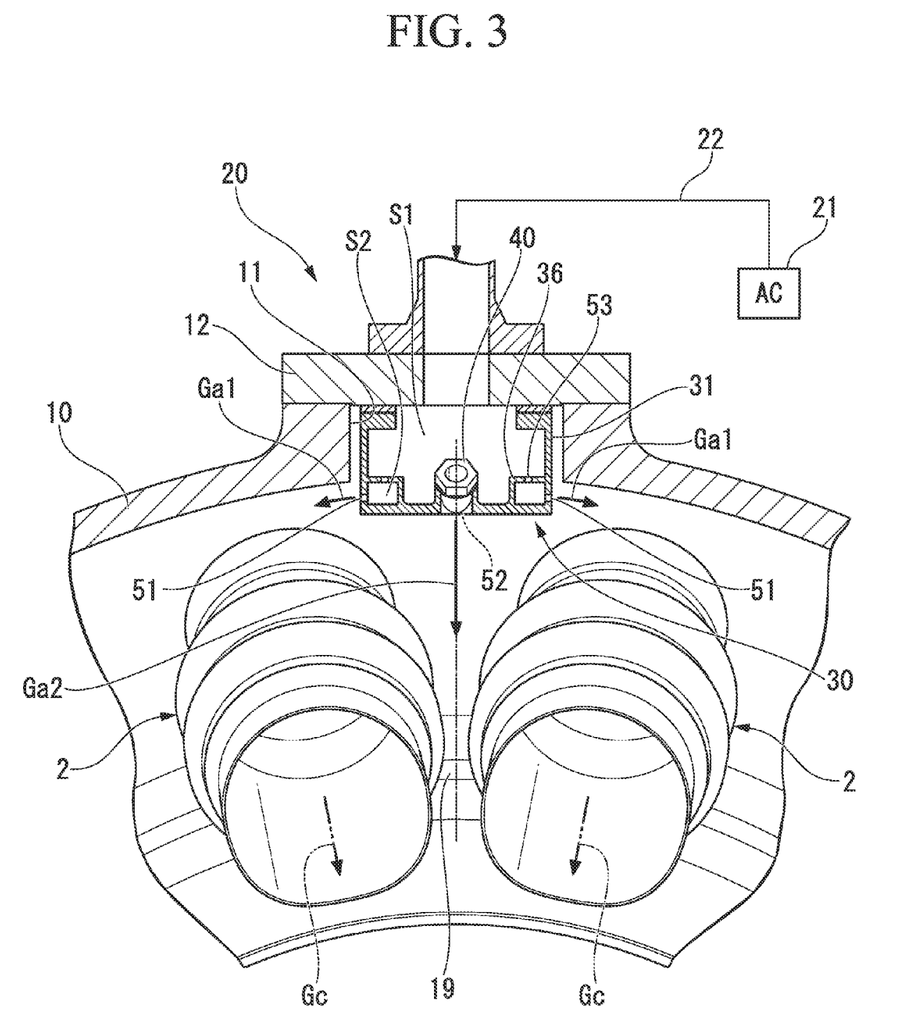
FIG. 3 is a sectional view taken along line in FIG. 2.

As shown in FIG. 2 and FIG. 3, the buffer tank 30 is fixed on the turbine casing 10 inner side of the manhole lid 12. Consequently, this buffer tank 30 is almost completely accommodated within the manhole 11. Moreover, the end part of the air line 22 is connected to the manhole lid 12. The buffer tank 30 has a cylindrical tank main body 31, a partition wall 36 which partitions the interior of the tank main body 31 into a first air chamber S1 and a second air chamber S2, and a nozzle 40 which ejects air Ga.

Figure 4:
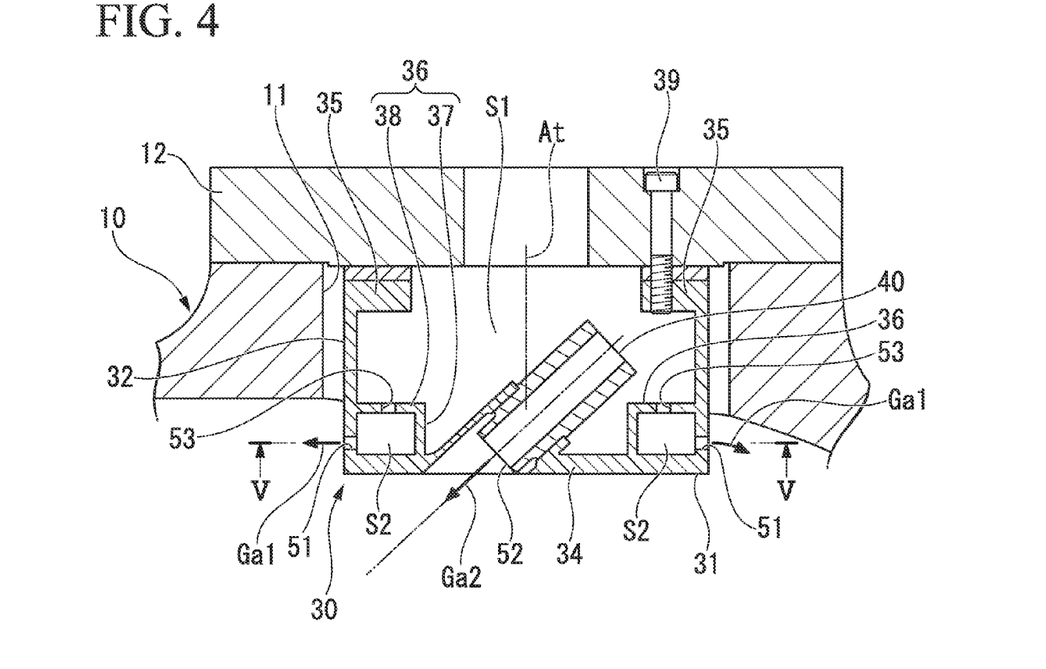
FIG. 4 is a sectional view of a buffer tank of the first embodiment according to the present invention.
Figure 5:
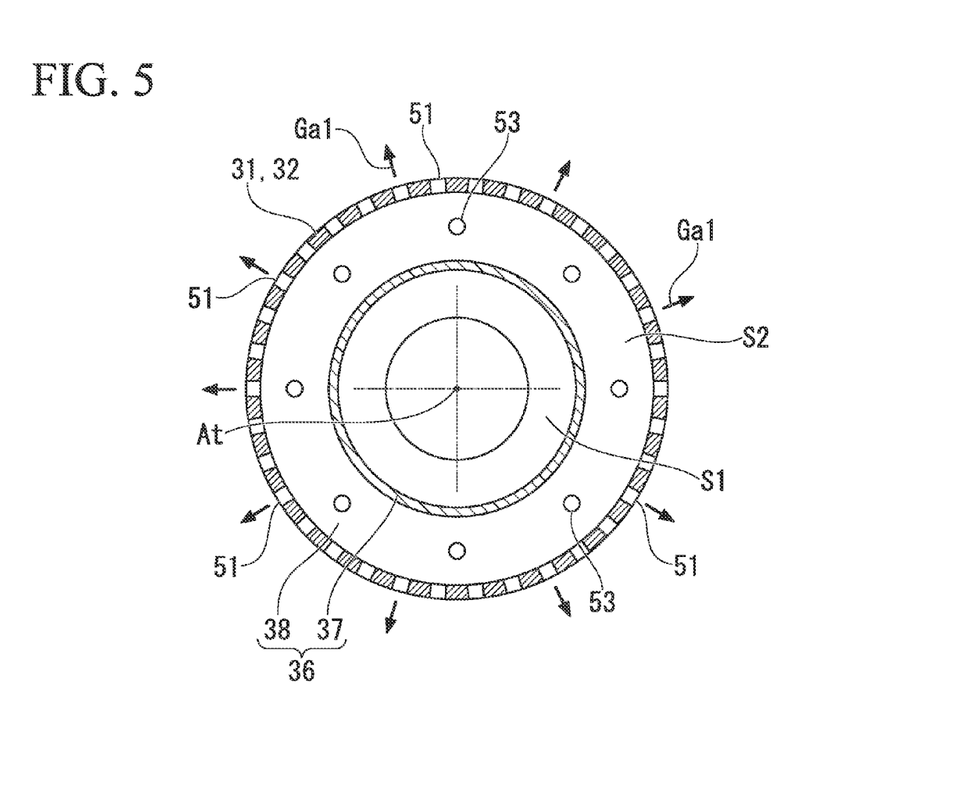
FIG. 5 is a sectional view taken along line V-V in FIG. 4.

As shown in FIG. 4 and FIG. 5, the tank main body 31 has: a body part 32 formed in a cylindrical shape; a bottom part 34 which blocks one end part of the body part 32; and a flange part 35 which projects from the other end part of the body part 32 toward the inner circumferential side. This tank main body 31 is fixed on the manhole lid 12 with bolts 39 which pass through the flange part 35. Hereunder, the center axis of the cylindrical body part 32 is referred to as tank axis At.

The partition wall 36 has: a cylindrical wall 37 which is formed in a cylindrical shape about the tank axis At on the inner circumferential side of the body part 32 of the tank main body 31; and a circular plate wall 38 which projects from one end part of this cylindrical wall 37 toward the outer circumferential side. The other end part of this cylindrical wall 37 is fixed on the bottom part 34 of the tank main body 31. Moreover, the outer circumferential edge of the circular plate wall 38 is fixed on the body part 32 of the tank main body 31. The space within the tank main body 31, between the cylindrical wall 37 of this partition wall 36 and the body part 32 of the tank main body 31, and between the circular plate wall 38 of this partition wall 36 and the bottom part 34 of the tank main body 31, forms the second air chamber S2 described above.

In the circular plate wall 38 (orifice plate) of the partition wall 36, there are formed a plurality of through holes 53 which pass therethrough from the first air chamber S1 to the second air chamber S2. Moreover, in the body part 32 (overall agitation air ejecting part), there are formed a plurality of overall agitation air openings 51 which eject the air Ga within the second air chamber S2 as overall agitation air Ga1 into the turbine casing 10.

The nozzle 40 is detachably fixed on the bottom part 34 of the tank main body 31 so that one opening thereof faces the interior of the turbine casing 10 and the other opening faces the interior of the first air chamber S1 within the tank main body 31. As shown in FIG. 2 and FIG. 3, this nozzle 40 is angled with respect to the radial direction Dr so that the stagnation part 19 described above is positioned on the extension line of the center axis thereof, and it is fixed on the bottom part 34 of the tank main body 31 in a state of facing between the two combustors 2 adjacent to each other in the circumferential direction Dc. That is to say, this nozzle 40 is fixed on the tank main body 31 so that the air Ga ejected from one of the openings is directed towards the stagnation part 19. Accordingly, this one opening of the nozzle 40 has a stagnation part agitation air opening 52 which is formed to eject the air Ga within the first air chamber S1 as stagnation part agitation air Ga2 toward the stagnation part 19.

Next, the effects of the purging device 20 described above are described.

In the gas turbine stop state where no fuel is being supplied to the combustor 2, higher temperature air is held in the upper part within the turbine casing 10 compared to the lower part, as described above. In addition, the air in the stagnation part 19 still continues to be held there even if some air flow is present in the turbine casing 10.

In the present embodiment, when the gas turbine is in the stop state described above, the air Ga is ejected from the purging device 20 into the turbine casing 10 to agitate the air within the turbine casing 10. Specifically, the air Ga from the air compressor 21 of the purging device 20 travels through the air line 22 and flows into the first air chamber S1 of the buffer tank 30. A part of the air Ga which has flowed into the first air chamber S1 is ejected as stagnation part agitation air Ga2 from the stagnation part agitation air opening 52 toward the stagnation part 19, and it agitates the stagnation part 19.

Moreover, the other part of the air Ga which has flowed into the first air chamber S1 travels through the plurality of through holes 53 formed in the circular plate wall 38 of the partition wall 36, and flows into the second air chamber S2. At this time, the air Ga suffers a pressure loss during the process of traveling through the through holes 53. As a result, the pressure of the interior of the second air chamber S2 becomes lower than the pressure of the interior of the first air chamber S1. The air Ga which has flowed into the second air chamber S2 is ejected as overall agitation air Ga1 into the turbine casing 10 from the plurality of overall agitation air openings S1 formed in the body part 32 of the tank main body 31. At this time, the overall agitation air Ga1 is ejected uniformly from the cylindrical tank main body 31 in the radial direction with respect to the tank axis At, and flows along the upper inner wall surface of the turbine casing 10, so as to agitate the almost entire turbine casing upper part.

When gas is ejected from a given opening, the ejection speed of this gas is dependent on the pressure difference between the upstream side and the downstream side of this opening. That is to say, in the case where the pressure of the opening downstream side is constant, when the pressure of the opening upstream side becomes higher, the ejection speed of the gas ejected from the opening becomes higher, and when the pressure of the opening upstream side becomes lower, the ejection speed of the gas ejected from the opening becomes lower. Therefore, the ejection speed at the time of ejecting the air Ga within the second air chamber S2, in which pressure is lower than that within the first air chamber S1, from the overall agitation air opening 51 into the turbine casing 10, is lower with respect to the ejection speed at the time of ejecting the air Ga within the first air chamber S1 from the stagnation part agitation air opening 52 into the turbine casing 10. That is to say, the ejection speed of the overall agitation air Ga1 is relatively lower with respect to the ejection speed of the stagnation part agitation air Ga2.

Here, the stagnation part 19, as seen from the purging device 20, is positioned on the opposite side to the combustor 2, and also the distance thereto is longer. Therefore, in order to actively agitate the stagnation part 19, the stagnation part agitation air Ga2 ejected from the stagnation part agitation air opening 52 needs to travel nearly straight toward the stagnation part 19. That is to say, this stagnation part agitation air Ga2 is required to have a straight traveling property. On the other hand, in order to agitate the entire upper part of the interior of the turbine casing 10 excluding the stagnation part 19, it is necessary that there is no portion which gets locally agitated and local excessive cooling is prevented. Therefore, the overall agitation air Ga1 ejected from the overall agitation air opening 51 is required to diffuse broadly.

In order to increase the straight traveling property of the air, it is preferable that the ejection speed of the air is high. On the other hand, in order to increase the diffusing property of the air, it is preferable that the ejection speed of the air is low.

Consequently, in the present embodiment, based on the above knowledge, the ejection speed of the stagnation part agitation air Ga2 is made relatively higher than the ejection speed of the overall agitation air Ga1, to thereby increase the straight traveling property of the stagnation part agitation air Ga2 and actively agitate the stagnation part 19. Furthermore, in the present embodiment, the ejection speed of the overall agitation air Ga1 is made relatively lower with respect to the ejection speed of the stagnation part agitation air Ga2, to thereby increase the diffusing property of the overall agitation air Ga1 and eliminate portions which do not get agitated in the upper part of the interior of the turbine casing 10 excluding the stagnation part 19.

As a result, in the present embodiment, the air in the entire upper interior of the turbine casing 10 can be sufficiently agitated, and the temperature difference can be suppressed to a minimum between the respective parts of the interior of the turbine casing 10. Accordingly, in the present embodiment, it is possible to suppress deformation in the turbine casing to a minimum when the gas turbine is in a stop state.

Moreover, in the present embodiment, two types of air Ga1 and Ga2 each having a different ejection speed are ejected into the turbine casing 10. However, since the buffer tank 30 needs only one type of air Ga supplied thereto, the air compressor 21 and the air line 22 can be unified, and manufacturing cost of the purging device 20 can be suppressed.

Furthermore, in the present embodiment, the buffer tank 30 is provided within the turbine casing 10. However, since this buffer tank 30 is almost entirely accommodated within the manhole 11, it is highly unlikely to obstruct the flow of the compressed air Gp within the turbine casing 10 when the gas turbine is operating. Furthermore, since this buffer tank 30 is attached to the manhole lid 12, by removing the manhole lid 12 from the turbine casing 10, this buffer tank 30 can be easily taken out to the outside of the turbine casing 10. Therefore, the buffer thank 30 can be easily repaired or modified.

Moreover, in the present embodiment, since the nozzle 40 which ejects stagnation part agitation air Ga2, is detachably provided on the tank main body 31 of the buffer tank 30, by replacing this nozzle 40 the flow rate or the ejection direction of the stagnation part agitation air Ga2 can be easily adjusted. However, the nozzle 40 does not always need to be detachable from the tank main body 31, and it may be formed integrated with the tank main body 31.

In the present embodiment, the through holes 53 are provided in the circular plate wall 38 of the partition wall 36 within the tank main body 31. However, the through holes 53 may be provided in the cylindrical wall 37 of the partition wall 36. However, in this case, it is preferable that, in the circumferential direction on the basis of the tank axis At, the positions of the through holes 53 in the cylindrical wall 37 do not match with the positions of the overall agitation air openings 51 in the body part 32 in the tank main body 31. This is to prevent the air Ga which has passed through the through holes 53 in the cylindrical wall 37, from traveling straight, and consequently ejecting a large amount of air Ga from the overall agitation air opening 51 located at the destination of this straight traveling, resulting in insufficient ejection of air Ga from other overall agitation air openings 51.

First Modified Example of First Embodiment

Figure 6:
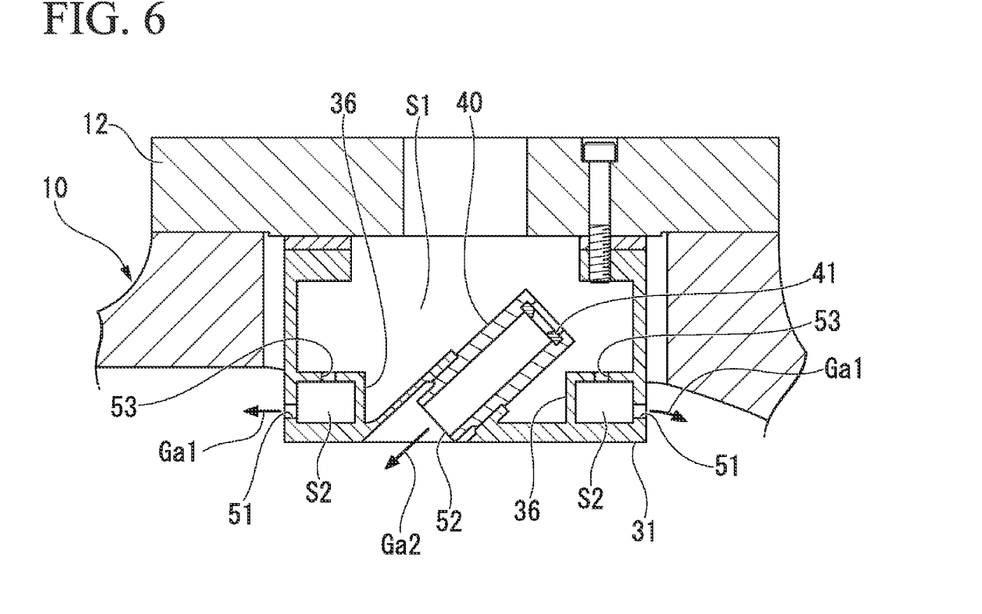
FIG. 6 is a sectional view of a buffer tank of a first modified example of the first embodiment according to the present invention.

Next, a first modified example of the first embodiment is described, with reference to FIG. 6.

This modified example is one where an orifice 41 is provided in the nozzle 40. Other configurations are similar to those in the first embodiment.

In this modified example, as mentioned, the orifice 41 is provided in the nozzle 40, and it is thereby possible to adjust the ejection speed of the stagnation part agitation air Ga2 which is ejected from the nozzle 40. However, as mentioned above, since the ejection speed of the stagnation part agitation air Ga2 needs to be higher than the ejection speed of the overall agitation air Ga1, the through hole diameter of the orifice 41 is defined so that the pressure between the orifice 41 in the nozzle 40 and the stagnation part agitation air opening 52 becomes higher than the pressure of the second air chamber S2.

Second Modified Example of First Embodiment

Figure 7:
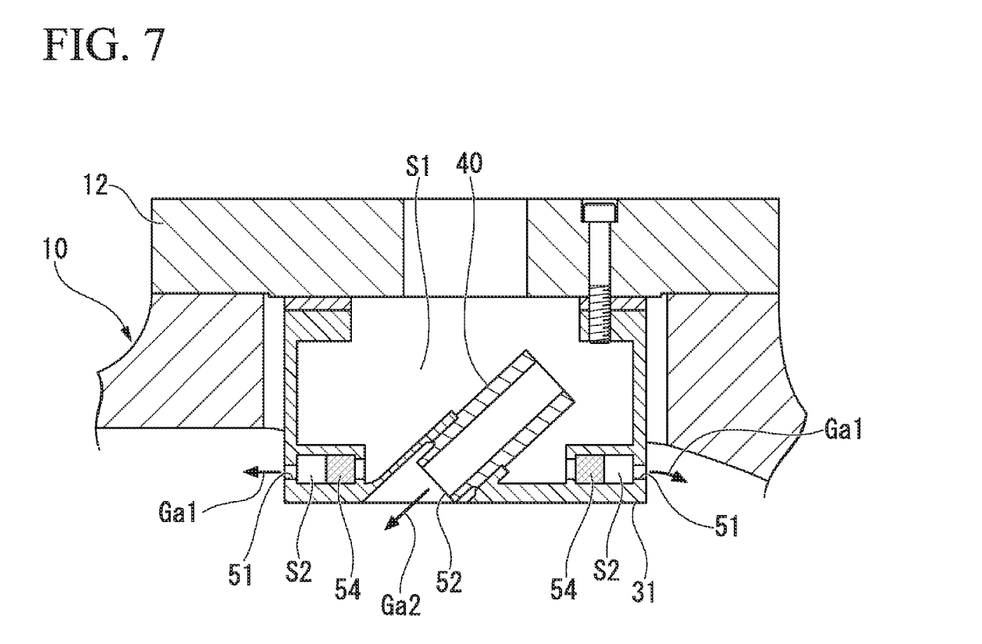
FIG. 7 is a sectional view of a buffer tank of a second modified example of the first embodiment according to the present invention.

Next, a second modified example of the first embodiment is described, with reference to FIG. 7.

In the first embodiment, a plurality of through holes 53 are formed in the circular plate wall 38 which serves as an orifice plate, in order to lower the pressure of the air Ga before this air Ga within the first air chamber S1 reaches the overall agitation air openings 51. In the present modified example, instead of this, a porous body 54 with a number of micro pores formed therein is provided as a pressure adjusting mechanism, on the first air chamber S1 side from the overall agitation air openings 51.

In the present modified example also, the pressure of the air Ga can be lowered before the air Ga within the first air chamber S1 reaches the overall agitation air openings 51. Therefore, as with the first embodiment, the ejection speed of the overall agitation air Ga1 can be made relatively lower with respect to the ejection speed of the stagnation part agitation air Ga2.

The pressure adjusting mechanism for lowering the pressure of the air Ga before the air Ga within the first air chamber S1 reaches the overall agitation air openings 51 in this manner is not limited to an orifice, and it may be of any form provided that it serves to resist the flow of the air Ga and lowers the pressure on the downstream side thereof. Therefore, for example, a piping with one end part opening into the first air chamber S1 and the other end part connected to the overall agitation air opening 51 may be provided in the tank main body 31 to serve as a pressure adjusting mechanism. In this case, this piping needs to cause a greater pressure loss than the nozzle 40, and therefore, the inner diameter thereof needs to be smaller than the inner diameter of the nozzle 40, and/or the length thereof needs to be greater than that of the nozzle 40.

Third Modified Example of First Embodiment

Figure 8:
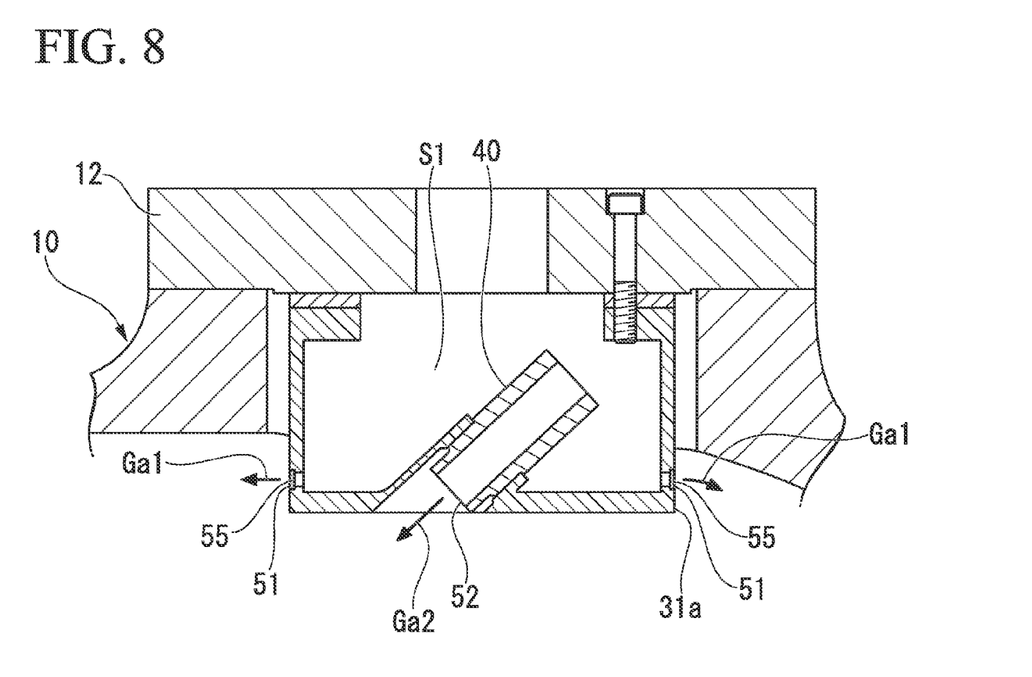
FIG. 8 is a sectional view of a buffer tank of a third modified example of the first embodiment according to the present invention.

Next, a third modified example of the first embodiment is described, with reference to FIG. 8.

In the first embodiment, a plurality of through holes 53 are formed in the circular plate wall 38 which serves as an orifice plate, in order to lower the pressure of the air Ga before this air Ga within the first air chamber S1 reaches the overall agitation air opening 51. In the present modified example, instead of this, a mesh structure body 55 is provided on the overall agitation air opening 51.

In this mesh structure body 55, there are formed a number of openings each with an area smaller than the opening area of the overall agitation air opening 51.

Also by providing the mesh structure body 55 on the overall agitation air opening 51, it is possible to make the ejection speed of the overall agitation air Ga1 relatively lower with respect to the ejection speed of the stagnation part agitation air Ga2.

In the present modified example, there is no need for ensuring a space to lower the pressure immediately before the overall agitation air opening 51, and therefore, the partition wall 36 of the first embodiment is not provided within the tank main body 31.

Second Embodiment

Figure 9:
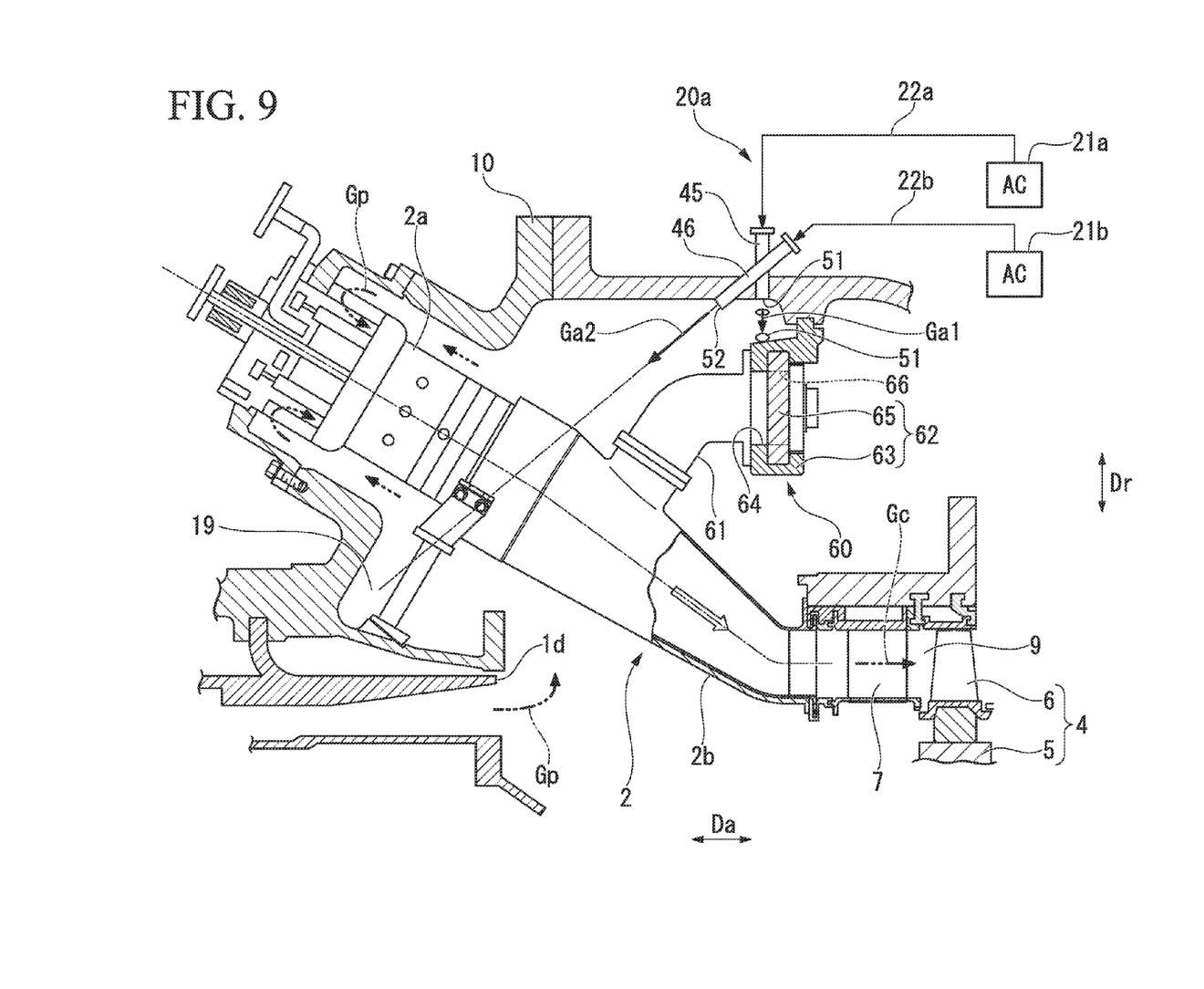
FIG. 9 is a sectional view of the main part of a gas turbine of a second embodiment according to the present invention.

Hereunder, a second embodiment of a gas turbine according to the present invention is described, with reference to FIG. 9.

The present embodiment differs from the first embodiment primarily in the purging device. Accordingly, hereunder there is mainly described a purging device 20a of the present embodiment.

The purging device 20a of the present embodiment is provided with: a first air compressor 21a and a second air compressor 21b serving as air supply sources; a plurality of overall agitation air ejecting pipes (overall agitation air ejecting parts) 45 which eject air from the first air compressor 21a as overall agitation air Ga1 into the turbine casing 10; an overall agitation air line 22a which feeds air from the first air compressor 21a to the plurality of overall agitation air ejecting pipes 45; a stagnation part agitation air ejecting pipe (stagnation part agitation air ejection part) 46 which ejects air from the second air compressor 21b as stagnation part agitation air Ga2 into the turbine casing 10; and a stagnation part agitation air line 22b which feeds air from the second air compressor 21b to the stagnation part agitation air ejecting pipe 46.

The second air compressor 21b constitutes a stagnation part agitation air supply source. Moreover, the first air compressor 21a constitutes an overall agitation air supply source, and it supplies air with a pressure lower than that of the air Ga supplied from the second air compressor 21b.

A tip end side opening of the stagnation part agitation air ejecting pipe 46 opens within the turbine casing 10, and forms a stagnation part agitation air opening 52. Moreover, a tip end side opening of the overall agitation air ejecting pipe 45 also opens within the turbine casing 10, and forms an overall agitation air opening 51.

As with the nozzle 40 of the first embodiment, the stagnation part agitation air ejecting pipe 46 is angled with respect to the radial direction Dr so that the stagnation part 19 is positioned on the extension line of the center axis thereof, and it is fixed on the upper part of the turbine casing 10, in a state of facing between the two combustors 2 adjacent to each other in the circumferential direction Dc. On the other hand, the overall agitation air ejecting pipe 45 extends from the outer side toward the inner side in the radial direction Dr, and is nearly orthogonal to the rotor axis Ar. The respective overall agitation air openings 51 of the plurality of overall agitation air ejecting pipes 45 are arranged side by side in the circumferential direction Dc on the inner wall surface of the turbine casing 10.

Incidentally, the gas turbine of the present embodiment is provided with an air bypass device 60 which supplies compressed air Gp from the compressor 1 to the midstream part of the combustor 2. The combustor 2 has a tail pipe 2b which feeds high temperature and high pressure combustion gas Gc to the combustion gas flow passage 9 of the turbine 3, and a fuel supplier 2a which supplies fuel and compressed air Gp into this tail pipe 2b. The air bypass device 60 is provided with a bypass piping 61 for supplying compressed air Gp within the turbine casing 10 into this tail pipe 2b of the combustor 2, and a grid valve 62 which adjusts the flow rate of compressed air Gp flowing into the bypass piping 61.

The bypass piping 61 is connected to the tail pipe 2b of each of the plurality of combustors 2 arranged side by side in the circumferential direction Dc. The grid valve 62 is a valve which adjust the flow rate of compressed air Gp flowing into each bypass piping 61. Accordingly, the grid valve 62 has a valve casing 63 which forms a ring shape about the rotor axis Ar, and a valve body 65 formed as a circular plate about the rotor axis Ar and which moves in the circumferential direction Dc while being in contact with this valve casing 63. In the ring-shaped valve casing 63, in the portion connected to each bypass piping 61, there is formed an opening 64. Moreover, in the valve body 65 in the circular plate, there are formed openings 66 as many as the number of the openings 64 of the valve casing 63.

The grid valve 62 is such that the valve body 65 moves in the circumferential direction Dc relatively to the valve casing 63, and thereby, the flow rate of fluid flowing from the opening 66 of the valve body 65 to the bypass piping 61 through the opening 64 is adjusted.

The plurality of overall agitation air openings 51 described above are arranged on the outer circumferential side in the radial direction Dr of this grid valve.

Next, the effects of the purging device 20a of the present embodiment are described.

Air from the second air compressor 21b which constitutes the stagnation part agitation air supply source travels through the stagnation part agitation air line 22b and the stagnation part agitation air ejecting pipe 46, and is ejected as stagnation part agitation air Ga2 from the stagnation part agitation air opening 52 into the turbine casing 10. This stagnation part agitation air Ga2 travels toward the stagnation part 19 and agitates the region within the stagnation part 19.

Moreover, air from the first air compressor 21a, which constitutes the overall agitation air supply source, travels through the overall agitation air line 22a and the overall agitation air ejecting pipe 45, and is ejected as overall agitation air Ga1 from the overall agitation air opening 51 into the turbine casing 10. This overall agitation air Ga1 travels from the overall agitation air opening 51 toward the inner side in the radial direction Dr, and it hits the grid valve 62 arranged on the inner side in the radial direction Dr of the overall agitation air opening 51 and diffuses.

Since the discharge pressure of the second air compressor 21b is higher than the discharge pressure of the first air compressor 21a as described above, the ejection speed of the stagnation part agitation air Ga2 is higher than the ejection speed of the overall agitation air Ga1. Therefore, the stagnation part agitation air Ga2 has a high level of straight traveling property and can actively agitate the stagnation part 19. One the other hand, since the discharge pressure of the first air compressor 21a is lower than the discharge pressure of the second air compressor, the ejection speed of the overall agitation air Ga1 is lower than the ejection speed of the stagnation part agitation air Ga2. Accordingly, the overall agitation air Ga1 ejected from the overall agitation air opening 51, while diffusing, hits the grid valve 62 and further diffuses. In addition, since the speed of the overall agitation air Ga1 hitting the grid valve 62 is relatively low, it can also infiltrate to the inner circumferential side of the grid valve 62.

As a result, in the present embodiment also, the air in the entire upper interior of the turbine casing 10 can be sufficiently agitated, and deformation in the turbine casing 10 can be suppressed to a minimum when the gas turbine is in a stop state.

Even in the case where no grid valve 62 is provided, if overall agitation air Ga1 of a sufficient flow rate is supplied into the turbine casing 10 at a low speed, it is possible, without allowing local excessive cooling to occur, to replace high temperature air held at the upper part of the interior of the turbine casing 10 with the overall agitation air Ga1. Therefore, even in the case where no grid valve 62 is provided, the turbine casing 10 can be cooled while preventing local excessive cooling, and deformation in the turbine casing 10.

First Modified Example of Second Embodiment

Figure 10:
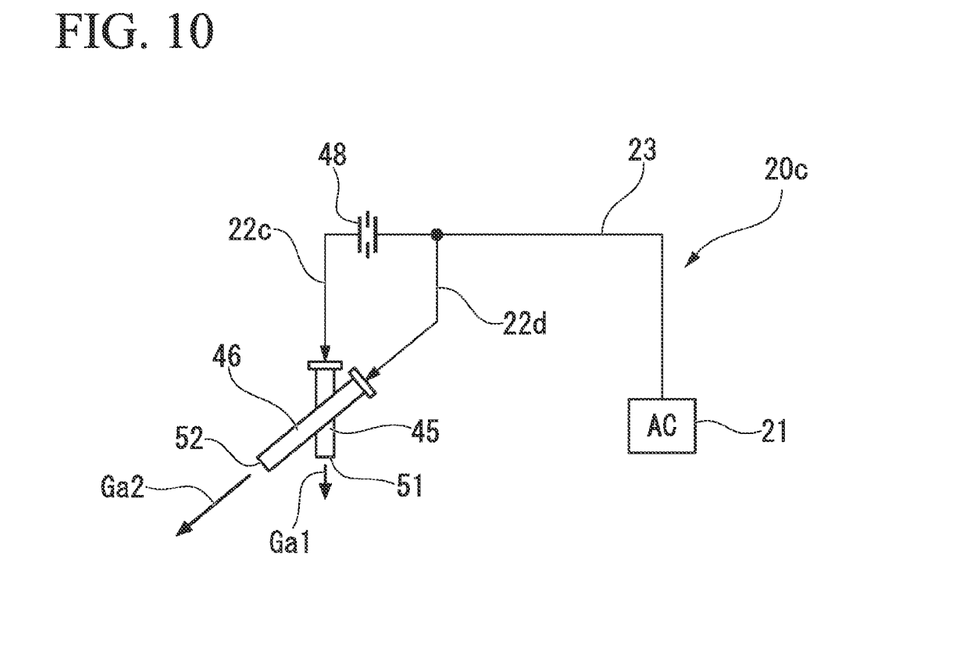
FIG. 10 is an explanatory diagram showing a configuration of a purging device in a first modified example of the second embodiment according to the present invention.

Next, a first modified example of the second embodiment is described, with reference to FIG. 10.

A purging device 20c of the present modified example has: an air compressor 21 serving as an air supply source; a plurality of overall agitation air ejecting pipes 45 which eject part of the air from the air compressor 21 as overall agitation air Ga1 into the turbine casing 10; a stagnation part agitation air ejecting pipe 46 which ejects another part of this air as stagnation part agitation air Ga2 into the turbine casing 10; an air primary line 23 for feeding air from the air compressor 21 to the overall agitation air ejecting pipes 45 and the stagnation part agitation air ejecting pipe 46; an overall agitation air line 22c which branches from this air primary line 23 and feeds air from the air primary line 23 to the overall agitation air ejecting pipes 45; a stagnation part agitation air line 22d which branches from the air primary line 23 and feeds air from the air primary line 23 to the stagnation part agitation air ejecting pipe 46; and an orifice 48 which is provided on the overall agitation air line 22c.

The orifice 48 is provided as a pressure adjusting mechanism for lowering the pressure on the overall agitation air opening 51 side on the basis of this orifice 48. As a result, in the present modified example also, as with the second embodiment, the ejection speed of the overall agitation air Ga1 ejected from the overall agitation air opening 51 is lower than the ejection speed of the stagnation part agitation air Ga2 ejected from the stagnation part agitation air opening 52. Therefore, in the present modified example also, as with the second embodiment, the air in the entire upper interior of the turbine casing 10 can be sufficiently agitated, and deformation in the turbine casing 10 can be suppressed to a minimum when the gas turbine is in a stop state.

Moreover, in the present modified example, compared to the first modified example, manufacturing cost of the purging device 20c can be suppressed, as the air compressor 21 and the air lines are partly shared.

In the present modified example, the orifice 48 is used as a pressure adjusting mechanism. However, the pressure adjusting mechanism may be of any form provided that it serves to resist air flow and lowers the pressure on the downstream side thereof as described in the second modified example of the first embodiment.

Second Modified Example of Second Embodiment

Figure 11:
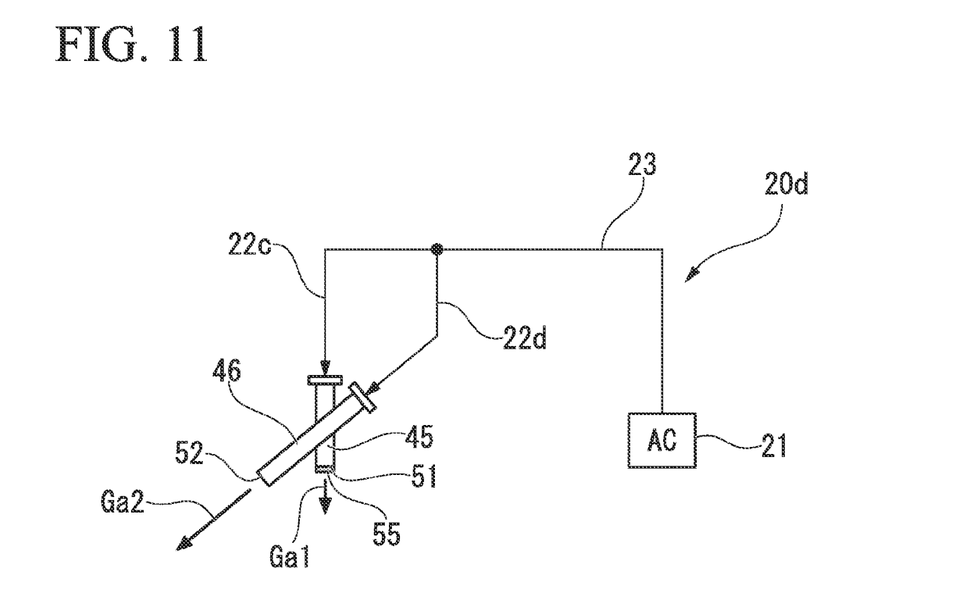
FIG. 11 is an explanatory diagram showing a configuration of a purging device in a second modified example of the second embodiment according to the present invention.

Next, a second modified example of the second embodiment is described, with reference to FIG. 11.

A purging device 20d of the present modified example is a further modified example of the first modified example, and is such that on the overall agitation air opening 51, there is provided a mesh structure body 55, instead of the orifice 48 in the first modified example. This mesh structure body 55 is similar to the mesh structure body 55 illustrated in the third modified example of the first embodiment, in which there are formed a number of openings each having an area smaller than the opening area of the overall agitation air opening 51.

In the present modified example also, the ejection speed of the overall agitation air Ga1 can be made relatively lower with respect to the ejection speed of the stagnation part agitation air Ga2, and deformation in the turbine casing 10 can be suppressed to a minimum when the gas turbine is in a stop state.

What is claimed is:

1. A purging device which ejects air into a turbine casing of a gas turbine to prevent deformation in the turbine casing when the gas turbine is in a stop state, the purging device comprising:
   an air compressor which supplies the air;
   a buffer tank including a partition wall configured to partition an interior of the buffer tank into a first air chamber having a first volume and a second air chamber having a second volume less than the first volume,
   wherein the air flows into the first air chamber such that a first portion of the air is within the first air chamber at a first pressure,
   wherein the partition wall is provided with a through hole to communicate a second portion of the air from the first air chamber to within the second air chamber at a second pressure lower than the first pressure;
   a stagnation part agitation air ejecting part provided with at least one stagnation part agitation air opening facing a stagnation part where gas flow stagnates in the turbine casing and configured to eject the first portion of the air from the first air chamber through the stagnation part agitation air opening as stagnation part agitation air;
   an overall agitation air ejecting part provided with a plurality of overall agitation air openings facing a portion in the turbine casing different from the at least one stagnation part and configured to eject the second portion of the air from the second air chamber through the plurality of overall agitation air openings as overall agitation air, to agitate gas held in an upper space of the turbine casing.

2. A purging device according to claim 1, wherein the stagnation part agitation air ejecting part has an orifice.

3. A gas turbine comprising:
   a purging device according to claim 1, and
   the turbine casing.

4. A gas turbine provided with a purging device according to claim 1, and the turbine casing, wherein:
   a manhole is formed in an upper part of the turbine casing, and the manhole is blocked by a manhole lid; and
   the buffer tank is fixed on the manhole lid at an inside of the turbine casing.

5. A purging device according to claim 1, wherein the through hole is offset from each of the plurality of overall agitation air openings.

6. A purging device according to claim 1, wherein the first air chamber has a first cross-sectional area, and the second air chamber has as a second cross-sectional area less than the first cross-sectional area.

7. A purging device according to claim 6, wherein a cross-sectional area of the through hole is smaller than the second cross-sectional area.

8. A method of preventing deformation in a turbine casing of a gas turbine, comprising:
- a gas turbine stopping step of stopping fuel supply to the gas turbine;
- an air supplying and pressure adjusting step of supplying air to a first air chamber in which a first portion of the air flows and a second air chamber in which a second portion of the air flows, the first air chamber and the second air chamber being divided by a partition wall and fluidly connected by a through hole in the partition wall, wherein the second portion of the air is communicated to the second air chamber from the first air chamber by the through hole such that a pressure of the second portion of the air is lower than a pressure of the first portion of the air;
- an air ejecting step of ejecting the first portion of the air from the first air chamber as stagnation part agitation air flowing toward a stagnation part where gas flow within the turbine casing stagnates to thereby agitate gas proximate the stagnation part, and ejecting the second portion of the air from the second air chamber as overall agitation air flowing toward a plurality of portions different from the stagnation part within the turbine casing, and wherein the overall agitation air is ejected at a larger number of positions than the stagnation part agitation air.

* * * * *